July 20, 1965  E. ROWLAND ETAL  3,196,303
SINGLE PHASE INDUCTION MOTOR
Filed March 20, 1962  2 Sheets-Sheet 1

INVENTORS
ERIC ROWLAND
EDWARD WILLIAM WILKINS
BY Blum, Moscovitz, Friedman
and Blum
Attorneys INVENTORS
ERIC ROWLAND
EDWARD WILLIAM WILKINS
BY Blum, Moscovitz, Friedman
 and Blum
Attorneys

United States Patent Office 3,196,303
Patented July 20, 1965

3,196,303
SINGLE PHASE INDUCTION MOTOR
Eric Rowland and Edward William Wilkins, both of Swindon, England, assignors to The Garrard Engineering and Manufacturing Company Limited, Swindon, England
Filed Mar. 20, 1962, Ser. No. 181,097
Claims priority, application Great Britain, Apr. 6, 1961, 12,341/61
6 Claims. (Cl. 310—172)

This invention relates to single phase induction motors, and more particularly to such motors of the shaded pole type in which the stator is provided with a permanently short-circuited winding, usually in the form of a copper band, inclined at an electrical angle with respect to the main stator winding in order to provide a torque for starting the motor when first switched on.

It is an object to provide an improved motor of this type in which the assembly of the short-circuited winding on the stator is facilitated.

The present invention consists in a single phase induction motor having one or more permanently short-circuited starting windings, wherein the stator is formed of separate magnetic metal members having complementary interlocking formations, the or each starting winding being located on one of these members before they are assembled in interlocking relationship.

Figure 1:
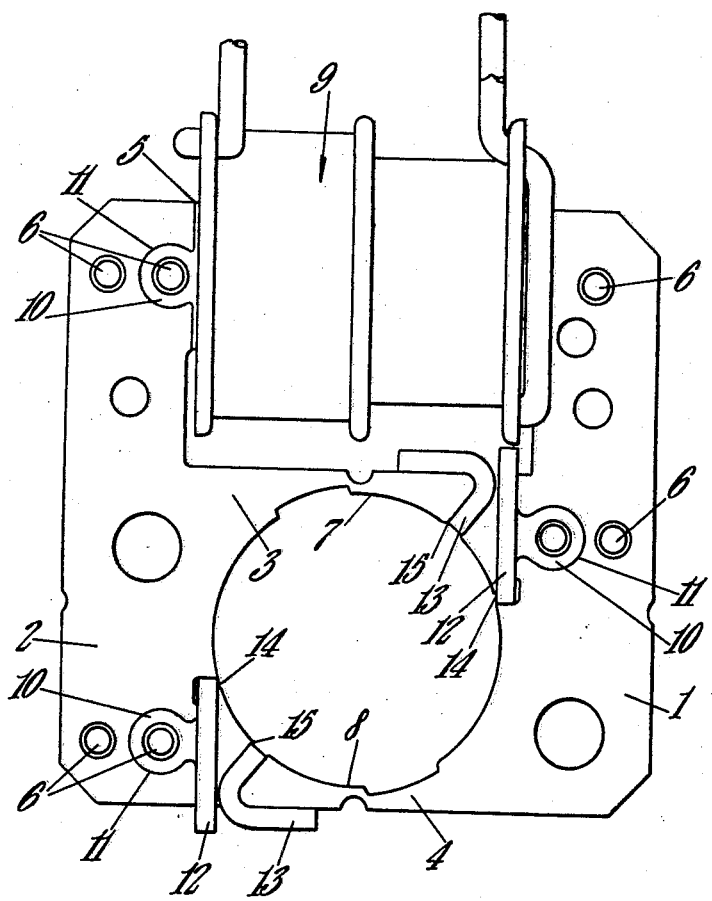
FIGURE 1 shows one form of stator according to the present invention.

In carrying the invention into effect according to one convenient mode by way of example, a single phase induction motor is provided with a stator consisting of two interlocked stator members 1 and 2, one member 1 being of generally rectangular U-shape and the other member 2 being T-shaped. The two members 1 and 2 are arranged with the vertical limb, or central leg, 3, of the T-shaped member 2 between and spaced from the limbs, or side legs, 4 and 5 of the U-shaped member 1 so as to define two rectangular magnetic circuits with a common side. Each of these members 1 and 2 is built up from a number of appropriately shaped laminations held together by rivets 6.

One side edge of the central leg 3 of the T-shaped member 2 and the inner side edge of one side leg 4 of the U-shaped member 1 are provided with arcuate cut-away portions 7 and 8 respectively which co-operate to define a generally cylindrical stator tunnel of known configuration. The other side leg 5 of the U-shaped member 1 carries the main excitation winding 9 of the motor.

The free end of each side leg 4 or 5 of the U-shaped stator member 1 and the free end of the central leg 3 of the T-shaped member 2 are formed with a tongue 10 having a part-circular (but greater than semi-circular) cross-section which is constant in the direction of the axis of the stator tunnel.

Each tongue interlocks with a groove 11 of complementary shape formed adjacent the end of the horizontal arm or head of the T-shaped member 2 or at the centre of the bight of the U-shaped member 1.

Alternatively, but not shown, the tongues and grooves may be of dove-tail or other suitable interlocking configuration.

Figure 2:
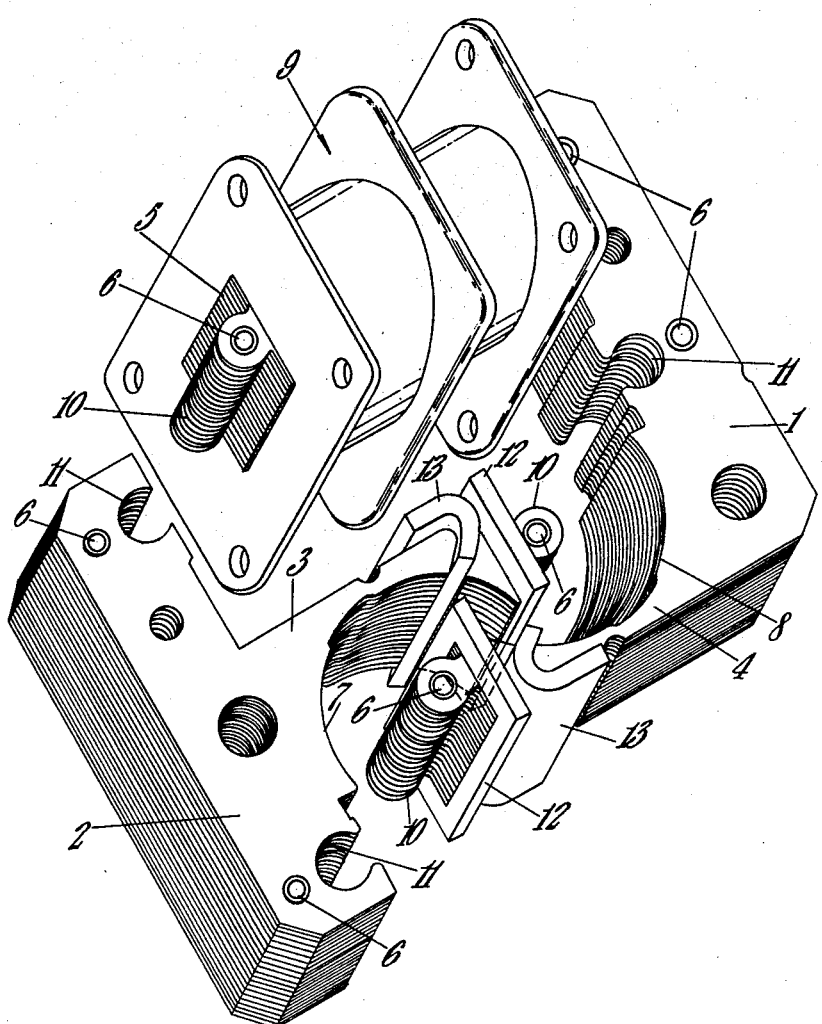
FIGURE 2 shows the stator of FIGURE 1 before assembly.

It will be realised that the stator is assembled by arranging one stator member over the other, as shown in FIGURE 2, in the desired arrangement in plan, and then pressing or forcing the two members together so that relative movement between them in the direction of the axis of the stator tunnel causes the two members to lie in the same plane, with the tongues 10 of the members sliding into interlocking relationship in the complementary grooves 11.

However, before the stator is assembled in this fashion, the main excitation winding 9 is located on the side leg 5 of the U-shaped member 1 and copper starting bands 12 and 13, are located on the stator members 1 and 2 in the following manner.

The lower free end, as viewed in FIG. 1, of the central leg 3 of the T-shaped member 2 and the upper free end as viewed in FIG. 1, of that side leg 4 of the U-shaped member 1 which defines the stator tunnel in part, are grooved or cut away adjacent their tongues 10 to provide end portions of reduced cross-sectional area for accommodating the starting band 12.

Before the two members 1 and 2 are assembled, starting bands 12, each in the form of an endless band punched out of a single piece of material, so as to be without a joint, are located on these end portions, so that when the stator is finally assembled the two starting bands 12 are located at diametrically opposite points on the stator tunnel.

The plane of each starting band 12 is arranged to be tangential to the stator tunnel and the gap 14 between adjacent members 1 and 2 at the surface of the stator tunnel is made as small as possible.

Additional grooves 15 are provided around the periphery of the stator tunnel for accommodating additional starting bands 13 which are positioned in the grooves 15 and then bent flat on their sides remote from the stator tunnel.

The stator constructed in this way may then be provided with a rotor in known manner to provide a single phase induction motor.

Various modifications may be made within the scope of the present invention.

We claim:
1. A single phase induction motor having one or more permanently short-circuited starting windings wherein the stator is formed of two separate magnetic metal members, one member being generally U-shaped with a bight having a pair of side legs extending therefrom, and the other member being generally T-shaped with a head having a central leg extending therefrom; the free ends of said legs and the inner edges of said bight and said head being formed with complementary interlocking formations, one edge of said central leg and the inner edge of one side leg, when said members are assembled, conjointly defining a substantially cylindrical stator tunnel completely closed laterally by magnetic metal, said members being assembled by relative movement parallel to the axis of said tunnel to interlock said formations, at least one of said legs having a starting winding laterally embracing the same adjacent the free end thereof and inwardly of the interlocking formation on such free end whereby, when said two members are assembled, said starting winding is maintained against displacement by that portion of the other member having an interlocking formation cooperable with the interlocking formation on the free end of said one leg.

2. A single phase induction motor, as claimed in claim 1, said starting winding being an integral, one-piece member of electrically conductive metal.

3. A single phase induction motor, as claimed in claim 1, including a pair of starting windings, one of said starting windings being located adjacent the free end of said central leg and the other of said starting windings being located against the free end of said one side leg, and said starting windings being located at diametrically opposite points of said stator tunnels.

4. A single phase induction motor, as claimed in claim 3, wherein the plane of each starting winding is tangential to said stator tunnel.

5. A single phase induction motor, as claimed in claim 3, including a pair of additional starting windings, one positioned on said central leg and the other on said side leg, and both additional starting windings being inwardly of the free end of said central leg and of said one side leg, respectively.

6. A single phase induction motor, as claimed in claim 1, wherein the free end of said one leg is formed with a shoulder extending along at least one lateral surface thereof, said starting winding seating against said shoulder and being retained thereby against displacement inwardly of said one leg.

References Cited by the Examiner

UNITED STATES PATENTS

| | | | |
|---|---|---|---|
| 2,047,487 | 7/36 | O'Leary | 310—172 |
| 2,064,090 | 12/36 | Sullivan et al. | 310—172 |
| 2,251,673 | 8/41 | Gillen | 310—172 |
| 2,251,674 | 8/41 | Gillen | 310—172 |
| 2,711,008 | 6/55 | Smith | 29—155.5 |
| 2,935,785 | 5/60 | Stein | 29—155.5 |

ORIS L. RADER, *Primary Examiner.*

MILTON O. HIRSHFIELD, *Examiner.*